United States Patent [19]
Goto et al.

[11] Patent Number: 5,982,295
[45] Date of Patent: Nov. 9, 1999

[54] ANTI-THEFT DEVICE HAVING EXCELLENT IDENTIFICATION CODE OVERWRITING CAPABILITIES

[75] Inventors: Masahiro Goto; Ikuo Hayashi, both of Okazaki; Takahide Kitahara, Nishio; Fumio Asakura, Okazaki; Ryozo Okumura, Kariya; Kiyokazu Yoshida, Nishikasugai-gun, all of Japan

[73] Assignee: Denso Corporation, Kariya, Japan

[21] Appl. No.: 08/769,395

[22] Filed: Dec. 19, 1996

[30] Foreign Application Priority Data

Dec. 21, 1995 [JP] Japan ................................ 7-333733

[51] Int. Cl.⁶ .................................................. H04Q 5/22
[52] U.S. Cl. ..................... 340/825.54; 307/10.1; 70/252; 235/382.5
[58] Field of Search .................. 340/825.54, 825.72, 340/825.69, 825.34; 307/10.1, 10.2, 10.3, 10.6; 235/382, 382.5; 70/278, 252

[56] References Cited

U.S. PATENT DOCUMENTS 4,898,010  2/1990  Futami et al. .
5,406,274  4/1995  Lambropoulos et al. ......... 340/825.69

FOREIGN PATENT DOCUMENTS 314143    5/1989   European Pat. Off. .
5-39767   2/1993   Japan .
2289357   11/1995  United Kingdom .

*Primary Examiner*—Michael Horabik
*Assistant Examiner*—Anthony A. Asongwed
*Attorney, Agent, or Firm*—Pillsbury Madison & Sutro, LLP

[57] ABSTRACT

A controller drives a key interlock solenoid to lock a key so that the key cannot be pulled out of a key cylinder when a shift lever is not at a parking position or while an identification code is being sent to a transponder mounted in the key. Thus, the key cannot be pulled out of the key cylinder during the writing of the identification code in the transponder.

20 Claims, 5 Drawing Sheets

5,982,295

ANTI-THEFT DEVICE HAVING EXCELLENT IDENTIFICATION CODE OVERWRITING CAPABILITIES

CROSS-REFERENCE TO RELATED APPLICATION

This application is related to and claims priority from Japanese Patent Application No. Hei-7-333,733, the contents of which are hereby incorporated by reference.

BACKGROUND OF THE INVENTION

1. Field of the Invention

The present invention relates to an anti-theft device for use in a vehicle or the like. More specifically, the present invention relates to an improved anti-theft device for performing communication operations with a transponder mounted in a key or card and for permitting a starting operation of the vehicle or the like when it receives a valid response code from the transponder.

2. Description of Related Art

In coordination with a mechanical key device of a vehicle, one known conventional anti-theft device performs code-based communication with an electromagnetic coupling transponder mounted inside a key via amplitude modulation. This anti-theft device allows the starting of the vehicle when the transponder of the key sends back a valid identification code. FIG. 5 shows one example of such a conventional anti-theft device.

The anti-theft device illustrated in FIG. 5 includes the transponder 2 mounted in a head portion of a key 1, a transceiver 5 which performs code-based communication with the transponder 2 via an antenna coil 4 that is wound around a key cylinder 3 into which the key 1 is inserted and a controller 6 for controlling the operations of the transceiver 5.

The transponder 2 reads an identification code stored in its EEPROM and subsequently encrypts the same identification code before sending it to the transceiver 5. The transponder 2 then receives a transmission code from the transceiver 5 and decrypts the same code before overwriting the identification code stored inside its EEPROM with the decrypted code. The above-mentioned device employs a rolling code format in which the identification code is changed every time the key 1 is inserted into the key cylinder 3.

Meanwhile, after receiving the identification code from the transponder :2, the transceiver 5, which is disposed in the vehicle side and which performs code-based communication with the transponder 2, verifies the received identification code in reference to an identification code it possesses and issues a permission command to activate an engine control unit (ECU) 7 under at least the condition that both identification codes match. After the controller 6 issues such permission, the ECU 7 begins the overall operations of an ignition system (e.g., driving spark plugs), an injection system (e.g., driving injectors) and a fuel supply system (e.g., driving a fuel pump).

The anti-theft device illustrated in FIG. 5 is provided with a key interlock solenoid 33 which mechanically inhibits a key switch (i.e., ignition switch) 32 from being switched from an "IGNITION ON" position to an "OFF" position to prevent the key 1 from being pulled out of the key cylinder 3 when a shift lever (not shown) is not at a "PARKING" position. A driver 8 controls the operation of the key interlock solenoid 33.

Meanwhile, regarding the overwriting of the identification code within the EEPROM of the controller 6 with the identification code from the transceiver 5, the overwriting of the identification code of the EEPROM of the controller 6 is not performed when the changed identification codes do not coincide due to factors such as incomplete overwriting of the identification code because the key 1 is pulled out, for example, while in the middle of overwriting the identification code of the transponder 2.

Thus, even with the adoption of the rolling code format for changing the identification codes of the transponder 2 and the controller 6, the overall level of safety and reliability of the anti-theft device itself deteriorates when the overwriting of the identification code of the controller 6 is not carried out.

SUMMARY OF THE INVENTION

In view of the foregoing problems in the prior art, an object of the present invention is to provide an anti-theft device whose security and reliability is greatly enhanced by its reliable and accurate performance of a process for overwriting an identification code of a transponder.

One aspect of the present invention provides an anti-theft device for use in a target device into which a portable device that has a transponder is inserted. The anti-theft device includes a memory, a communication unit, a determination unit, a control unit and a locking unit. The memory stores a target identification code. The communication unit is for sending a new identification code to the transponder of the portable device and for receiving a transponder identification code from the transponder of the portable device. The determination unit is for determining that the transponder identification code is invalid unless the transponder identification code received by the communication unit matches the target identification code stored in the memory. The control unit is for inhibiting operations of the target device when the determination unit determines that the transponder identification code is invalid. The locking unit is for preventing the portable device from being removed from the target device until the communication unit completes sending the new identification code to the transponder of the portable device.

In this way, the portable device cannot be removed from the target device until the portable device receives all of the new communication code from the communication unit. Thus, removal of the portable device in the middle of overwriting its identification code can be effectively avoided and accordingly, the reliability of the anti-theft device significantly improves.

Preferably, the transponder of the portable device sets the new identification code from the communication unit as its own transponder identification code. Furthermore, the locking unit is for preventing the portable device from being removed from the target device while the determination unit is still determining if the transponder identification code matches the target identification code.

Preferably, the target device is a vehicle that includes a key interlock solenoid and an ignition switch unit into which the portable device is inserted. Also, the locking unit is for preventing the portable device from being detached from the ignition switch unit by controlling the key interlock solenoid to prevent the ignition switch unit from being switched off. In this way, the key cannot be removed from the ignition switch unit while the communication unit is sending the new identification code to the portable device. Thus, the overwriting of the identification code of the portable device can be reliably performed.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are described hereinafter with reference to the accompanying drawings.

Figure 1:
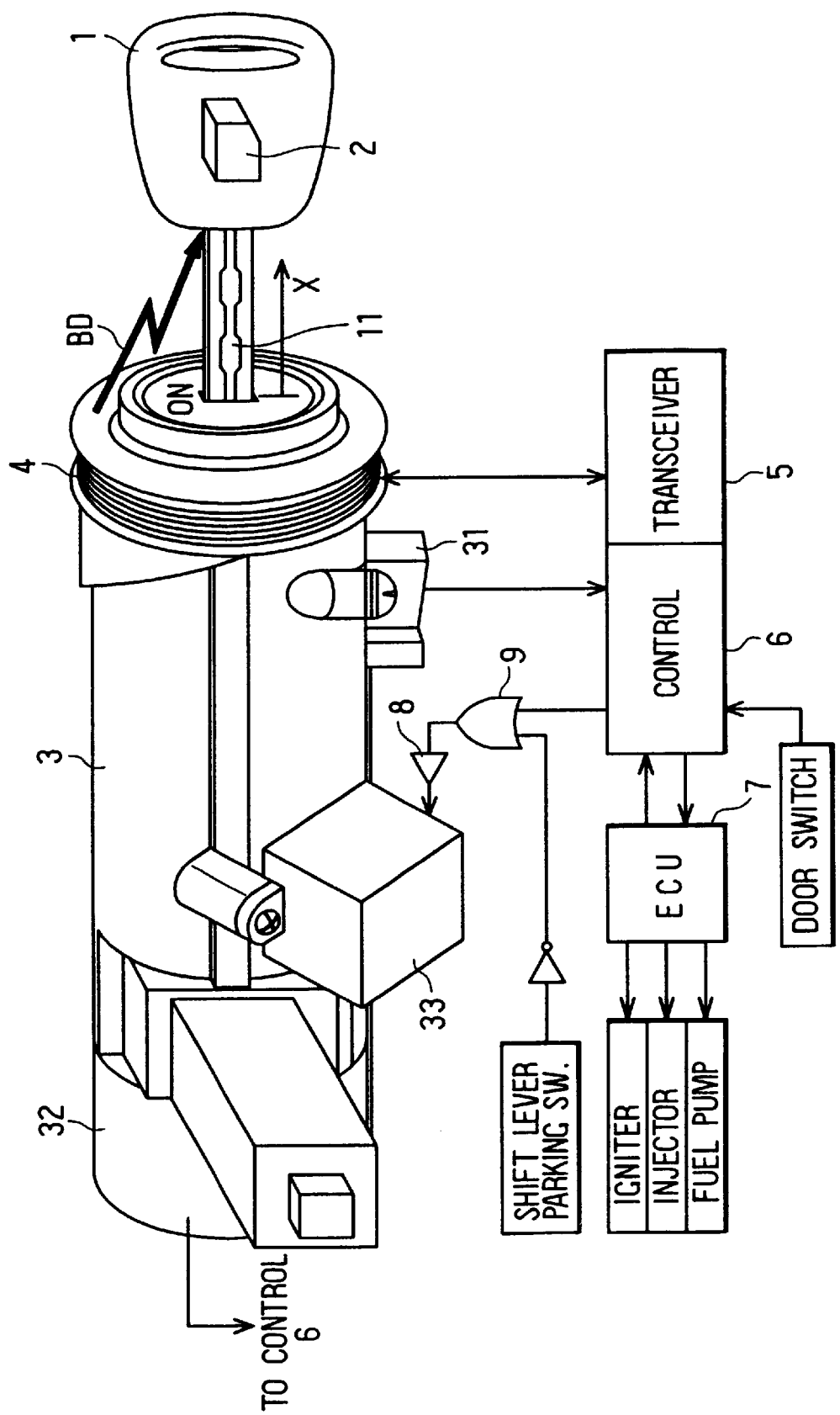
FIG. 1 is a block diagram of an anti-theft device according to a first embodiment of the present invention.

FIG. 1 shows an anti-theft device according to a first embodiment of the present invention.

Figure 5:
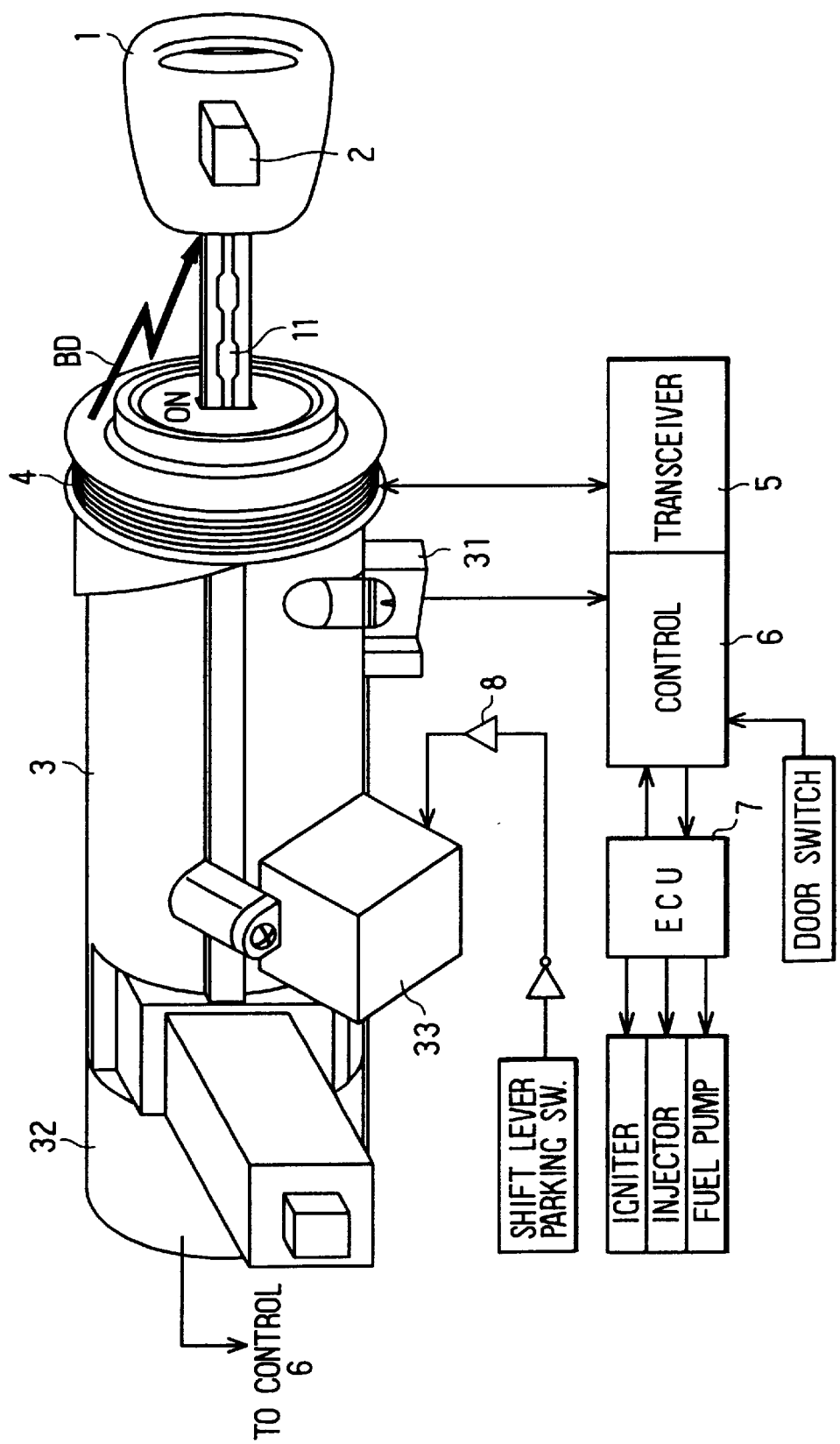
FIG. 5 is a block diagram of a conventional anti-theft device.

This anti-theft device is also used here for a vehicle and has a basic structure similar to the conventional anti-theft device shown in FIG. 5. As shown in FIG. 1, the anti-theft device of the first embodiment is provided with a key interlock solenoid 33 for mechanically inhibiting an ignition switch 32 (also known as key switch) from being switched from an "IGNITION ON" position to an "OFF" position when a shift lever is not at a "PARKING" position to prevent a key 1 inserted inside a key cylinder 3 from being pulled out of the key cylinder 3. Unlike the conventional anti-theft device, the anti-theft device of the present embodiment also has an OR gate 9 which enables a controller 6 to exercise control over the operations of a key interlock solenoid 33 via a driver circuit 8 even during code-based communication with a transponder 2 by means of electromagnetic coupling.

Next, the operation of the anti-theft device of the first embodiment will be explained below with reference to the flowchart of FIG. 2.

After a driver inserts the key 1 into the key cylinder 3 in step 100, the controller 6 determines that the key 1 has been inserted via a key unlock warning switch (key presence switch) 31 and starts to retrieve an identification code of the transponder 2 of the key 1 (step 101). When retrieving the identification code of the transponder 2, power is supplied from the transceiver 5 to the same transponder 2 via electromagnetic coupling. Thereafter, the identification code retrieved from an EEPROM of the transponder 2 is sent to the transceiver 5. The transceiver 5 decrypts the received identification code following a predetermined procedure and provides the decrypted code to the controller 6. It is noted that this process of retrieving the identification code of the key 1 is carried out during a 100 ms time period from the time the key 1 is inserted into the key cylinder 3 up to the time the ignition switch 32 is switched to a "START" position.

After receiving the identification code described above and after the ignition switch 32 is actuated (switched to the "IGNITION ON" position), the controller 6 verifies the received identification code by comparing it with an identification code it stores within its own EEPROM to determine whether these identification codes match (step 102).

If the controller 6 determines that these identification codes do not match because the key 1 is, for example, a forged key, the same controller 6 generates a disabling code to an engine control unit (ECU) 7 for inhibiting the starting of the engine (step 103). Thereby, the ECU 7 inhibits the operations of spark plugs, injectors, fuel pump and the like (step 104). In this way, the vehicle is immobilized and thus, theft of the vehicle is prevented.

On the other hand, when the controller 6 determines in step 102 that these identification codes match, the controller 6 provides an enabling code to the ECU 7 for allowing the starting of the engine (step 105) and rolls the identification code by preparing a new identification code in replacement of the present identification code (step 107).

After the starting permission is issued (step 105), the ECU 7 controls the igniter, the injector, the fuel pump and the like so that the vehicle can be driven conditions such as whether the door is closed and the like may also be included as conditions for issuing the starting permission.

Meanwhile, after changing the identification code by preparing the new identification code (step 107), the controller 6 may encrypt the new identification code using random numbers when necessary to make decryption of the identification code difficult if ever such identification code is intercepted (step 108). Thereafter, after the ignition switch 32 is actuated, the key interlock solenoid 33 is driven via the controller 6 to lock the key 1 within the key cylinder 3 and prevent it from being removed (step 113). Then, overwriting with the new identification code is started (step 109). Here, power is supplied again via electromagnetic coupling from the transceiver 5 to the transponder 2 of the key 1 during the overwriting of the identification code. In this case, the pulse position modulation based on amplitude modulation is performed on the electric power supplied to the transponder 2 and then, the received identification code is decrypted by the transponder 2 and stored in its EEPROM.

After the identification code in the transponder 2 is overwritten as described above, the controller 6 starts retrieving the changed identification code (step 110) via the transceiver 5 to check the same while supplying electric power to the transponder 2. At the same time, the transponder 2 automatically responds by sending the identification code written in its EEPROM while receiving unmodulated power from the controller 6.

After receiving the identification code, the controller 6 verifies in step 111 whether the received identification code matches the changed identification code.

When step 111 determines that the storage of the identification code in the transponder 2 has been normally completed, it overwrites in step 112 the identification code in the EEPROM of the controller 6 and subsequent step 114a lifts control over the key interlock solenoid 33. That is, step 114a removes the inhibition that prevents the key 1 from being pulled out or inserted.

When step 111 determines that the storage of the identification code has not been performed normally due to, for example, the existence of a conductor or a magnet that blocks a magnetic field BD generated from the antenna coil 4, the process of overwriting the identification code of the EEPROM of the controller 6 is stopped. Then, control over the key interlock solenoid 33 is eased (step 114b). That is, the inhibition on the key 1 from being pulled out/inserted is lifted.

In this way, the aforementioned problem of the key 1 being pulled out during the storage of the identification code can be prevented by preventing the key 1 from being pulled out by driving the key interlock solenoid 33 when the code-based communication is being performed between the transceiver 5 and the transponder 2.

Thus, the process of sending the new identification code in the transponder 2 can be performed more reliably and accurately and accordingly, the safety and reliability of the anti-theft device improves significantly.

In summary, the anti-theft device of the first embodiment has the following excellent effects which significantly improve its safety and reliability over conventional anti-theft devices. First, the probability of successfully performing the process of writing the identification code in the transponder 2 in just one key manipulation is increased considerably. Second, because pulling out of the key 1 is also inhibited when verifying the identification code after finishing the overwriting process, the reliability of the entire process related to the code-based communication improves significantly. Last, there is no need to provide any special mechanism for locking the key 1 inside the key cylinder 3 because of the use of the key interlock solenoid 33 which is normally mounted in the vehicle.

Meanwhile, the anti-theft device usually needs more power when sending and writing the identification code to the transponder 2 than that when executing the retrieval process, verifying the identification code of the transponder 2 or the like. That is, a communicable range during the storage of the identification code is shorter than that during the retrieval of the identification code. In fact, a range for storing the identification code in the transponder is considerably shorter than the range for retrieving the identification code from the transponder 2 which may be over 80 mm. In other words, sufficient reliability in the anti-theft device operations can be obtained during the overwriting of the identification code by also inhibiting the key 1 from being pulled out from the key cylinder 3 only when the communicable range is short.

FIGS. 3A–3C and 4 show a second embodiment of the anti-theft device which takes the above fact into consideration. The structure of the anti-theft device according to the second embodiment is the same as that of the first embodiment shown in FIG. 1 and hence, explanation will be made hereinafter mainly on the operation of the anti-theft device according to the second embodiment in reference to FIGS. 3A–3C and 4.

First, an outline of the operation of the anti-theft device according to the second embodiment will be explained hereinafter with reference to FIGS. 3A–3C.

Figure 3:
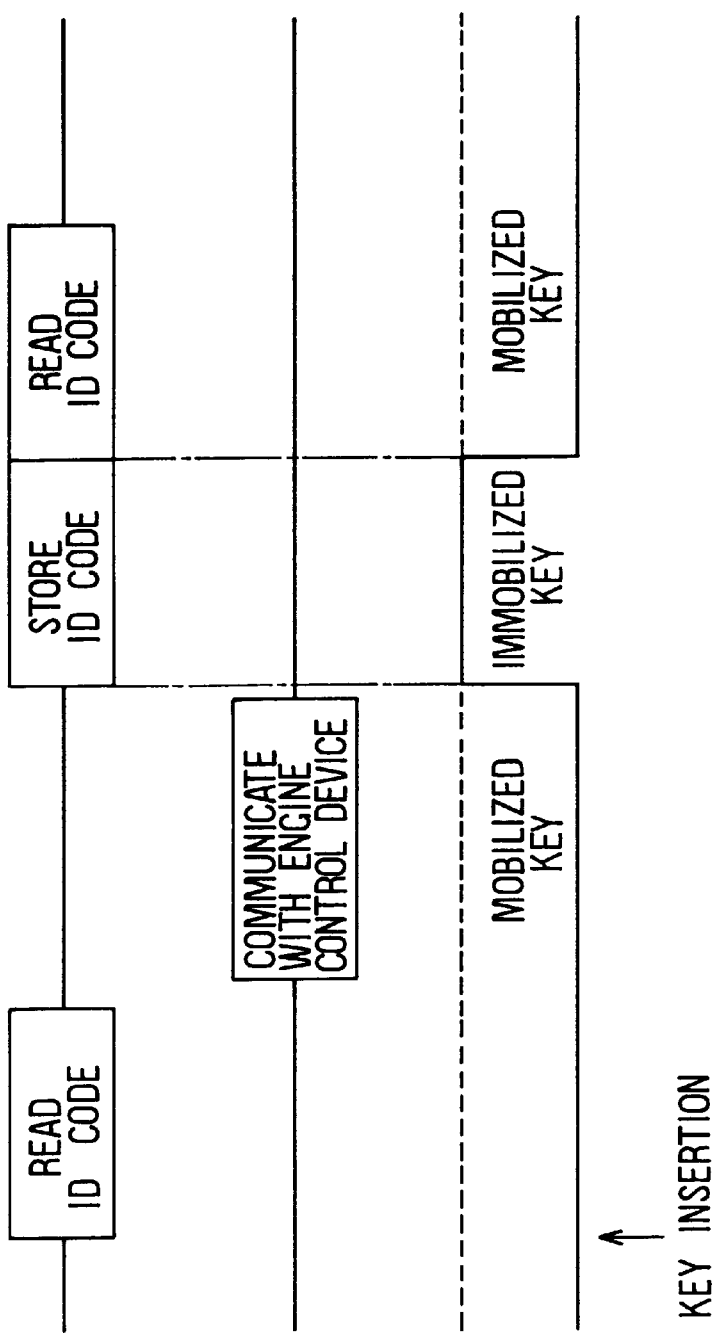
FIGS. 3A–3C are time charts showing an operation of the anti-theft device according to a second embodiment of the present invention.

It has been described before that the identification code stored in the transponder 2 is retrieved when the key 1 is inserted and if such identification code is a valid code, the starting permission is issued to the engine control unit 7 and thereafter, the changing of the identification code for rolling identification codes and the retrieval operation for verifying the identification code stored in the transponder 2 are carried out as shown in FIGS. 3A and 3B.

During the communication operation of the anti-theft device according to the second embodiment, as shown in FIG. 3C, the pulling out of the key 1 is inhibited by driving the key interlock solenoid 33 only during the period when the identification code is being stored in the transponder 2.

Figure 4:
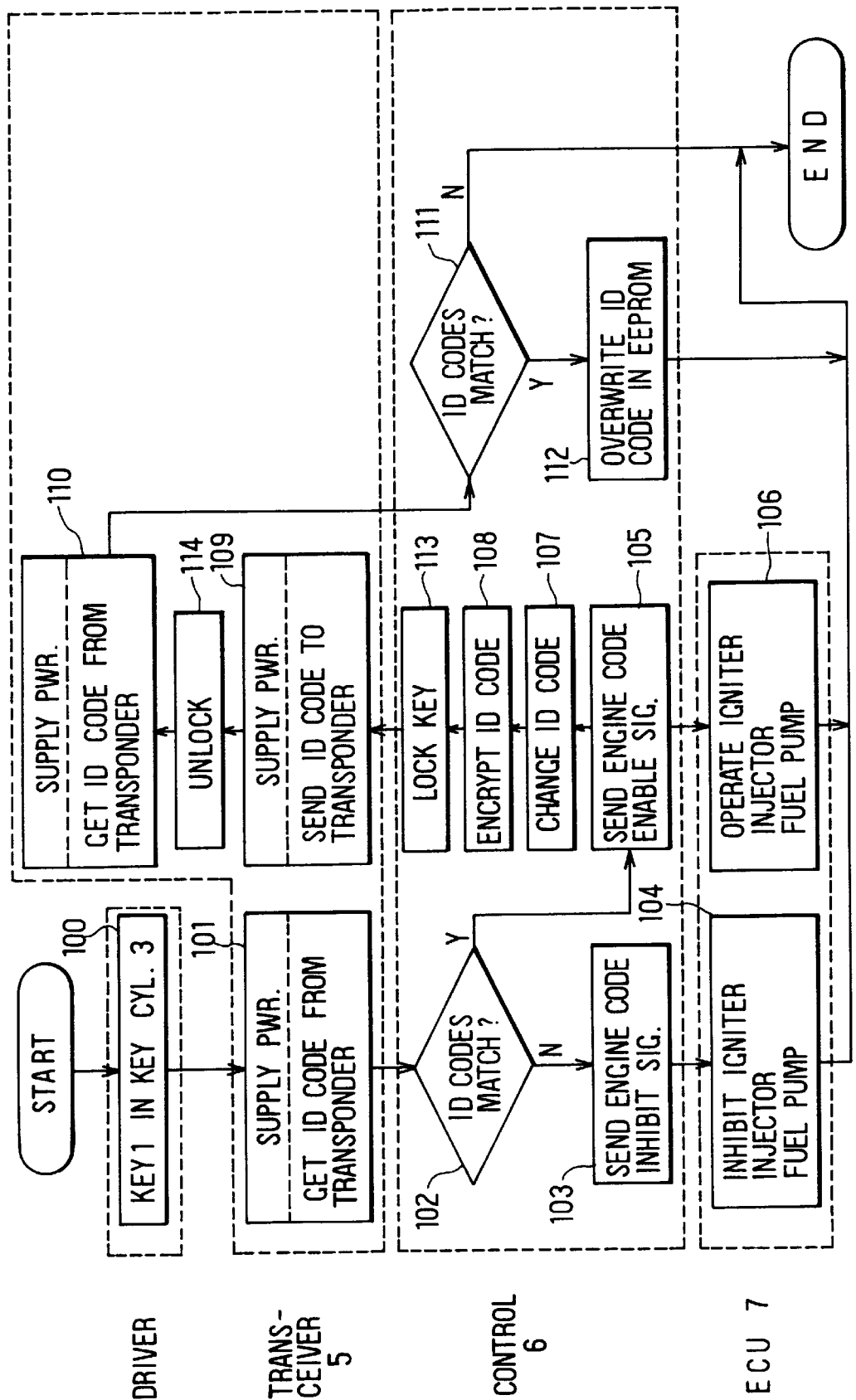
FIG. 4 is a flowchart of a main process executed by the anti-theft device according to the second embodiment.

FIG. 4 shows in detail the process executed by the anti-theft device.

Figure 2:
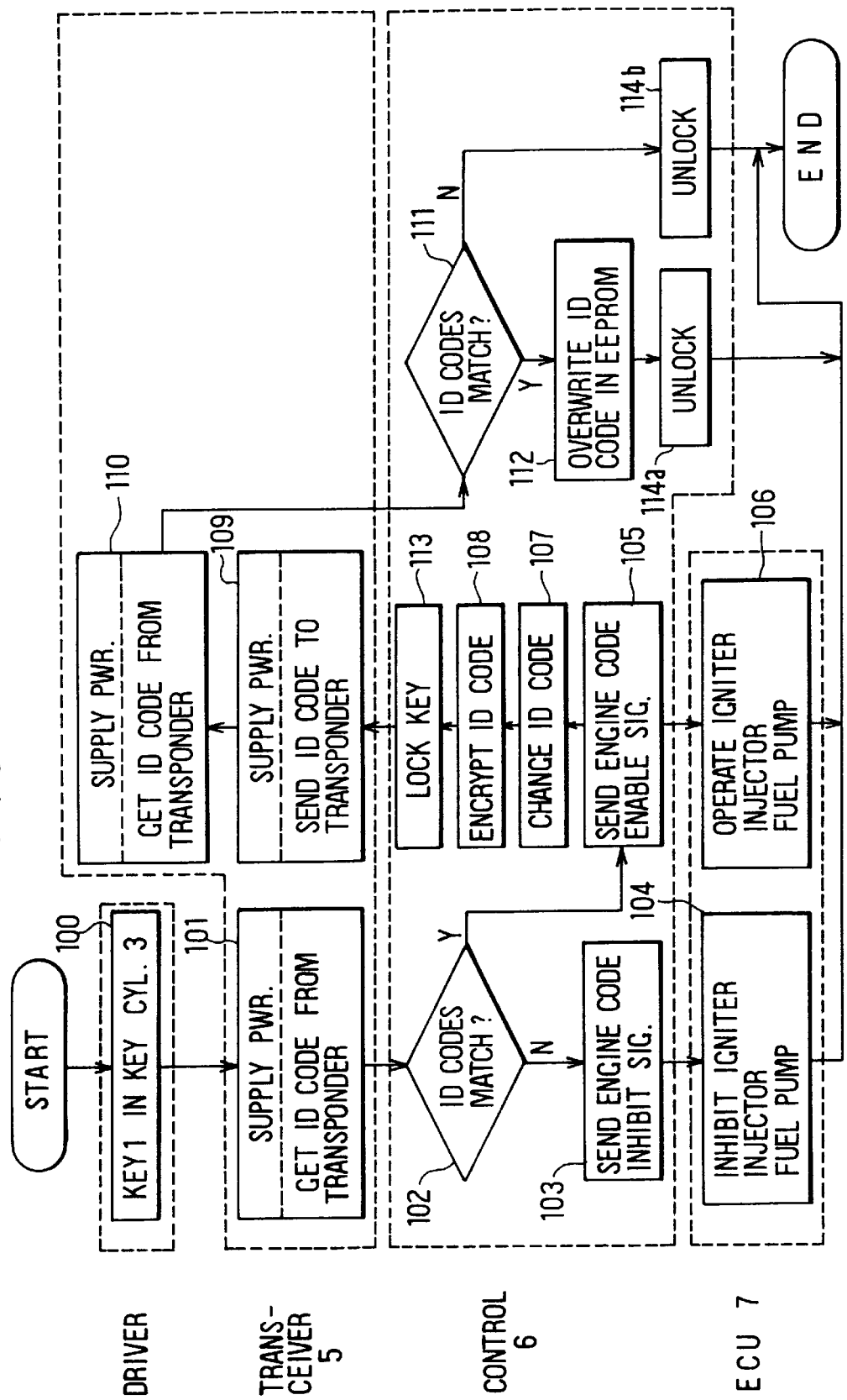
FIG. 2 is a flowchart of a main process executed by the anti-theft device according to the first embodiment.

It is noted that some of the steps of the process shown in FIG. 4 are similar to those shown in FIG. 2 and thus, the explanation of such steps will be omitted here.

In the process of FIG. 4, when step 102 determines that the identification codes match, control goes to step 105 which issues the permission to start the ECU 7 and then to step 107 which changes the identification for rolling the identification codes. It is noted that the identification code may be encrypted at this time as in step 108 based on random numbers so that it would be difficult to decrypt the identification code even if it is intercepted.

Next, while step 113 drives to lock the key interlock solenoid 33 to prevent the key 1 inserted into the key cylinder 3 from being pulled out, the anti-theft device of the present embodiment immediately unlocks the key interlock solenoid 33 in step 114 to lift the restriction on the key 1 after finishing the identification overwriting process of step 109. While it takes 70 msec to retrieve the identification code stored in the transponder 2, it usually takes much more time to deactuate the ignition switch 32 and remove the key 1 from the key cylinder 3.

In this way, the pulling out of the key 1 is at least prevented during the performance of code-based communication with the transponder 2 by driving the key interlock solenoid 33 during the storage of the identification code in the transponder 2. Accordingly, with the present embodiment, there is also increased probability of being able to safely and reliably overwrite the identification code of the transponder 2 and thus, the safety and reliability of the anti-theft device also improves.

As described above, the anti-theft device according to the second embodiment brings about the following effect in addition to the effects of that of the first embodiment mentioned above: the period for inhibiting the removal of the key 1 is suitably shortened while maintaining the minimum required level of reliability for performing code-based communication.

As described above, it becomes possible to favorably prevent vehicle theft using a forged key or the like by providing the transponder 2 in the key 1 and the transceiver 5 which performs code-based communication with the transponder 2 via the antenna coil 4 as well as the controller 6 in the vehicle side.

Although the present invention has been fully described in connection with preferred embodiments thereof with reference to the accompanying drawings, it is to be noted that various changes and modifications will become apparent to those skilled in the art.

For example, while the key 1 has been locked in the key cylinder 3 just before the process of overwriting the identification code (step 109) in the first and second embodiments described above, this process may also be executed prior to changing the identification code (step 107). While the period of restricting the key 1 is prolonged for this case, the overall reliability of the anti-theft device is further improved. In addition, step 110 may be executed before step 114 in the second embodiment.

Furthermore, although the case of the anti-theft device that is used in a vehicle has been explained for the sake of convenience, the present invention may be also be applied to other target devices as long as code-based communication is performed with the electromagnetic coupling transponder, which is installed in a key, a card or the like, by means of amplitude modulation, frequency modulation, phase modulation and the like and the operation of the target devices are allowed only when the transponder 2 sends back a valid code.

With the above-described anti-theft device, the problem of a portable device such as the key or card being pulled out during the sending and writing of the identification code is prevented by providing an apparatus for locking the portable device with the target device so that the portable device cannot be detached from the target device during the code communication with the transponder of the portable device.

Meanwhile, while the foregoing embodiments use the key interlock solenoid 33 to prevent the removal of the key 1 from the key cylinder 3, other devices which prevent the removal of the key 1 during the storage of ID code in its transponder 2 may be employed in place of the key interlock solenoid 33.

In addition, while the foregoing embodiments write the ID code in the transponder 2 after the ignition switch 32 is actuated, the ID code in the transponder 2 may also be overwritten after locking the key 1 inside the key cylinder 3 even if the ignition switch 32 is "OFF" using a locking mechanism different from the key interlock solenoid 33.

Such changes and modifications are to be understood as being within the scope of the present invention as defined by the appended claims.

What is claimed is:

1. An anti-theft device for use in a target device into which a transponder-carrying portable device is inserted in a position which permits operation of the target device, said anti-theft device comprising:

a memory for storing a target identification code;

communication means for receiving a transponder identification code from said transponder and for sending a new identification code to said transponder;

determination means for determining that said transponder identification code received by said communication means is invalid unless said transponder identification code matches said target identification code stored in said memory;

control means for inhibiting operation of said target device when said determination means determines that said transponder identification code is invalid;

locking means for preventing said portable device from being removed from said position in the target device until said communication means completes sending said new identification code to said transponder; and wherein the determination means additionally verifies that the new identification code received by the transponder matches the new identification code sent by the communication means.

2. An anti-theft device according to claim 1, wherein said locking means prevents said portable device from being removed from said target device until said determination means verifies that said new identification code received by the transponder matches said new identification code sent by the communication means.

3. An anti-theft device according to claim 2, wherein said locking means prevents said portable device from being removed from an ignition switch unit of a vehicle forming said target device by controlling a key interlock solenoid of said vehicle to prevent said ignition switch unit from being switched off.

4. An anti-theft device according to claim 1, wherein said locking means prevents said portable device from being removed from an ignition switch unit of a vehicle forming said target device by controlling a key interlock solenoid of said vehicle to prevent said ignition switch unit from being switched off until a shift lever of said vehicle is in a parking position.

5. A device as in claim 1 wherein the target device is a vehicle and wherein the portable device is an ignition key of the vehicle.

6. An anti-theft device for use in a target device to which a transpondler-carrying portable device is inserted in a position which permits operation of the target device, said anti-theft device comprising:

a memory which stores a target device identification code;

a code generator which generates a new identification code;

a transceiver which receives a transponder identification code from said transponder and which sends said new identification code generated by said code generator to said transponder;

determination means for determining that said transponder identification code received by said transceiver is invalid unless said transponder identification code matches said target identification code stored in said memory;

a controller which inhibits operation of said target device when said determination means that said transponder code is invalid; and locking means for preventing said portable device from being removed from said position in the target device until said transceiver completes sending said new identification code to said transponder; and wherein the determination means additionally verifies that the new identification code received by the transponder matches the new identification code sent by the transceiver.

7. An anti-theft device according to claim 6, wherein said locking means prevents said portable device from being removed from said target device until said determination means verifies that said new identification code matches said new identification code sent by the communication means.

8. An anti-theft device according to claim 7, wherein said code generator generates said new identification code based on said target identification code stored in said memory.

9. An anti-theft device according to claim 7, wherein said locking means prevents said portable device from being removed from an ignition switch unit of a vehicle forming said target device by controlling a key interlock solenoid of said vehicle to prevent said ignition switch unit from being switched off.

10. An anti-theft device according to claim 6, wherein said code generator generates said new identification code based on said target identification code stored in said memory.

11. An anti-theft device according to claim 6, wherein said locking means prevents said portable device from being removed from an ignition switch unit of a vehicle forming said target device by controlling a key interlock solenoid of said vehicle to prevent said ignition switch unit from being switched off.

12. An anti-theft device according to claim 6, wherein said locking means prevents said portable device from being removed from an ignition switch unit of a vehicle forming said target device by controlling a key interlock solenoid of said vehicle to prevent said ignition switch unit from being switched off until a shift lever of said vehicle is in a parking position.

13. A device as in claim 6 wherein the target device is a vehicle and wherein the portable device is an ignition key of the vehicle.

14. A method for preventing theft of a target device and for overwriting a transponder identification code of a transponder of a transponder-carrying portable device that is inserted into a position in said target device which permits operation of the target device, said method comprising:

storing a reference identification code;

receiving a first transponder identification code transmitted by said transponder;

determining if said first transponder identification code matches said references identification code;

inhibiting operation of said target device unless said first transponder identification code matches said reference identification code;

generating a new identification code when said first transponder identification code matches said reference identification code;

sending said new identification code to the transponder to overwrite said first transponder identification code of said transponder with said identification code;

preventing said portable device from being removed from said target device while executing said overwriting; and verifying that said new identification code received by the transponder matches the new identification sent to the transponder.

15. A method for preventing theft of a target device according to claim 14, said method further comprising:

replacing said reference identification code with a new reference identification code after verifying that said new identification code received by the transponder matches said new identification code sent to the transponder.

16. A method for preventing theft of a target device according to claim 15, wherein said generating includes generating said new identification code based on said reference identification code.

17. A method for preventing theft of a target device according to claim 15, said method further comprising allowing said portable device to be removed from said target device after said verification is completed.

18. A method for preventing theft of a target device according to claim 14, said method further comprising allowing said portable device to be removed from said target device after said overwriting and verification are completed.

19. A method for preventing theft of a target device according to claim 14, wherein said generating involves generating said new identification code based on said reference identification code.

20. A method as in claim 14 wherein the target device is a vehicle and wherein the portable device is an ignition key of the vehicle.

* * * * *

UNITED STATES PATENT AND TRADEMARK OFFICE
CERTIFICATE OF CORRECTION

PATENT NO. : 5,982,295
DATED : November 9, 1999
INVENTOR(S) : GOTO et al.

It is certified that error appears in the above-identified patent and that said Letters Patent is hereby corrected as shown below:

ON THE FACE OF THE PATENT

Please change "[73] Assignee: Denso Corporation, Kariya, Japan"
to
--[73] Assignee: Denso Corporation, Kariya, Japan;
Nippon Soken, Inc., Nishio, Japan--

Signed and Sealed this

Twenty-second Day of August, 2000

Attest:

Q. TODD DICKINSON

*Attesting Officer*       *Director of Patents and Trademarks*